U S008612754B2

United States Patent
Norton (10) Patent No.: US 8,612,754 B2
(45) Date of Patent: Dec. 17, 2013

(54) DIGITAL FINGERPRINTING VIA SQL FILESTREAM WITH COMMON TEXT EXCLUSION

(75) Inventor: Stephen Norton, Conyers, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 153 days.

(21) Appl. No.: 13/159,677

(22) Filed: Jun. 14, 2011

(65) Prior Publication Data

US 2012/0324220 A1 Dec. 20, 2012

(51) Int. Cl.
 *H04L 29/06* (2006.01)
(52) U.S. Cl.
 USPC .............................. 713/165; 726/1; 707/694
(58) Field of Classification Search
 None
 See application file for complete search history.

(56) References Cited

U.S. PATENT DOCUMENTS

| | | | |
|---|---|---|---|
| 6,505,302 B1 | 1/2003 | Matyas et al. | |
| 6,754,364 B1 | 6/2004 | Yacobi | |
| 7,624,435 B1 | 11/2009 | Huang | |
| 7,734,601 B2 | 6/2010 | Weber et al. | |
| 7,937,451 B2 | 5/2011 | Ho et al. | |
| 8,024,304 B2 * | 9/2011 | Pulfer et al. | 707/694 |
| 2002/0144293 A1 * | 10/2002 | Dimitrova et al. | 725/133 |
| 2004/0059933 A1 | 3/2004 | Levy | |
| 2005/0117777 A1 | 6/2005 | Yacobi | |
| 2006/0085469 A1 * | 4/2006 | Pfeiffer et al. | 707/102 |
| 2007/0217648 A1 | 9/2007 | Muehlbauer | |
| 2008/0229037 A1 * | 9/2008 | Bunte et al. | 711/162 |
| 2008/0263103 A1 | 10/2008 | McGregor et al. | |
| 2009/0037975 A1 | 2/2009 | Ishikawa et al. | |
| 2010/0017850 A1 * | 1/2010 | More et al. | 726/2 |
| 2010/0131847 A1 | 5/2010 | Sievert et al. | |
| 2010/0162347 A1 | 6/2010 | Barile | |
| 2011/0162086 A1 | 6/2011 | Rogel et al. | |
| 2012/0036366 A1 * | 2/2012 | May et al. | 713/176 |

* cited by examiner

*Primary Examiner* — Nadia Khoshnoodi
(74) *Attorney, Agent, or Firm* — Greenblum & Bernstein, P.L.C.

(57) ABSTRACT

A method provides data loss protection of sensitive data using digital fingerprinting. The method includes assigning a security level to each document of a plurality of documents associated with a data loss protection server, and storing the plurality of documents in a digital asset management server, wherein only a single copy of each document of plurality of documents is stored in the digital asset management server. The method also includes sending a query to the digital asset management server from the data loss protection server, and receiving a query response by the data loss protection server from the digital asset management server, the query response including at least one document file. The method further includes creating a digital fingerprint of the at least one document file by the data loss protection server.

20 Claims, 3 Drawing Sheets

DIGITAL FINGERPRINTING VIA SQL FILESTREAM WITH COMMON TEXT EXCLUSION

BACKGROUND

1. Field of the Disclosure

The present disclosure relates to the field of communications. More particularly, the present disclosure relates to providing data loss protection for data using digital fingerprinting. The methodology also utilizes common text exclusion for excluding specified portions of the data from the digital fingerprint.

2. Background Information

Traditionally, digital data loss systems connect to various network shares to create digital fingerprints of sensitive documents over a communication network. Such systems raise security concerns due to the manner in which the sensitive documents are stored and accessed over the network

DETAILED DESCRIPTION

In view of the foregoing, the present disclosure, through one or more of its various aspects, embodiments and/or specific features or sub-components, is thus intended to bring out one or more of the advantages as specifically noted below. According to an embodiment of the present disclosure, a method provides for data loss protection of sensitive data using digital fingerprinting. The method includes assigning a security level to each document or a plurality of documents associated with a digital asset management server, and storing the plurality of documents in a digital asset management server, wherein only a single copy of each document or plurality of documents is stored in the digital asset management server. The method also includes sending a query to the digital asset management server from the data loss protection server, and receiving a query response by the data loss protection server from the digital asset management server, the query response including at least one document file. The method further includes creating a digital fingerprint of the at least one document file by the data loss protection server.

In another embodiment, the query is a Structured Query Language (SQL) query.

In a further embodiment, the SQL query includes a document security level.

In an embodiment, the SQL query includes a document type.

In another embodiment, each row in the query response is a complete document file.

In a further embodiment, the method includes performing common text exclusion on the at least one document file, wherein the text of the document file identified for common text exclusion is not included in the digital fingerprinting of the document file.

In an embodiment, the method includes encrypting the at least one document file.

In another embodiment, the method also includes storing the digital fingerprint of the at least one document file in a secure fingerprint database controlled by the data loss protection server.

In a further embodiment, the method further includes removing any temporarily stored files associated with the at least one document file from data loss protection server immediately after the digital fingerprint is stored.

In an embodiment, the method includes assigning the security level to each document includes assigning different security levels to different sections of a document.

In another embodiment, the assigning of the security level to each document includes identifying sections of the document that are common to all of the plurality of security levels, and excluding the sections of the document that are common to all of the plurality of security levels from the creating the digital fingerprint of the document.

In a further embodiment, the single copy of each document of the plurality of documents stored in the digital asset management server can only be accessed through a single access protocol.

In an embodiment, the single access protocol includes verifying the validity of a request for access, granting or denying the request for access, and recording information regarding the request for access in a secure historical access log database.

In another embodiment, the providing data loss protection of sensitive data using digital fingerprinting includes processing of digital audio files.

In a further embodiment, the providing data loss protection of sensitive data using digital fingerprinting includes processing of digital video files.

In an embodiment, the providing data loss protection of sensitive data using digital fingerprinting includes processing of text documents, digital audio files, and digital video files, wherein a related text document, digital audio file, and digital video file are processed together in response to a query by the data loss protection server.

In another embodiment, the method also includes receiving a request for security verification of an identified document by the data loss protection server, creating a digital fingerprint of the identified document, and determining if the digital fingerprint of the identified document matches any of the digital fingerprints stored in the secure fingerprint database.

In a further embodiment, the method further includes monitoring a communication network for a particular document, creating a digital fingerprint of the particular document, and determining if the digital fingerprint of the particular document matches any of the digital fingerprints stored in the secure fingerprint database.

In an embodiment, a non-transitory computer-readable storage medium, encoded with at least one computer-executable program, includes program segments for assigning one security level of a plurality of security levels to each document of a plurality of documents associated with a data loss protection server, and storing the plurality of documents in a digital asset management server, wherein only a single copy of each document of the plurality of documents is stored in the digital asset management server. The medium of this embodiment also includes sending a query to the digital asset management server from the data loss protection server, and receiving a query response by the data loss protection server from the digital asset management server, the query response including at least one document in a document file. The medium of this embodiment further includes creating a digital fingerprint of the at least one document in the document file by the data loss protection server.

In another embodiment, a system provides for data loss protection of sensitive data using digital fingerprinting. The system includes a data loss protection server for creating digital fingerprints and for maintaining the digital fingerprints and monitoring for unauthorized transmission of sensitive documents, and a digital asset management server for assigning one security level or a plurality of security levels to each document of a plurality of documents and for storing the plurality of documents, wherein only a single copy of each document of the plurality of documents is stored in the digital asset management server. The system also includes a network connecting the data loss protection server and the digital asset management server, over which a query is received by the digital asset management server from the data loss protection server, and over which a query response is received by the data loss protection server from the digital asset management server, the query response including at least one document in a document file. In this embodiment, the data loss protection server creates a digital fingerprint of the at least one document in the document file.

Figure 1:
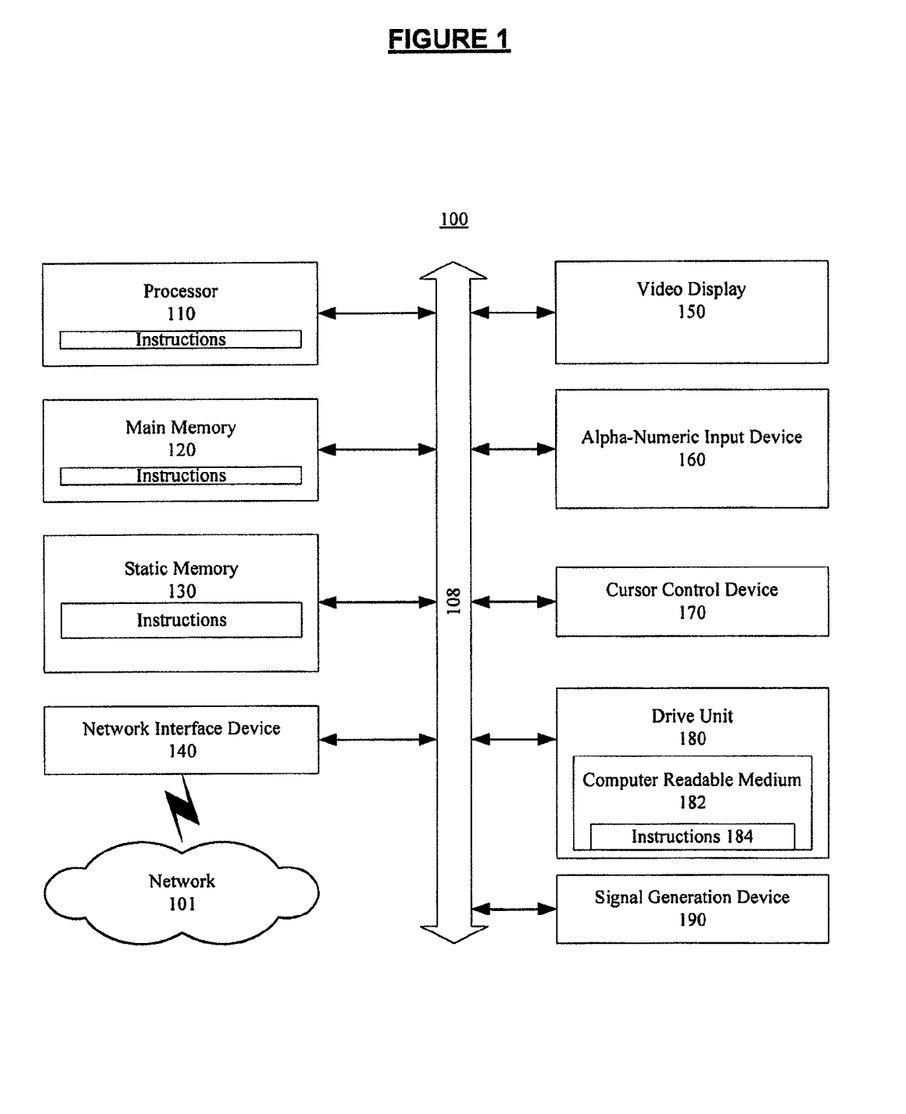
FIG. 1 shows an exemplary general computer system.

FIG. 1 is an illustrative embodiment of a general computer system, on which a method for providing dynamic traffic prioritization can be implemented, which is shown and is designated 100. The computer system 100 can include a set of instructions that can be executed to cause the computer system 100 to perform any one or more of the methods or computer based functions disclosed herein. The computer system 100 may operate as a standalone device or may be connected, for example, using a network 101, to other computer systems or peripheral devices.

In a networked deployment, the computer system may operate in the capacity of a server or as a client user computer in a server-client user network environment, or as a peer computer system in a peer-to-peer (or distributed) network environment. The computer system 100 can also be implemented as or incorporated into various devices, such as a personal computer (PC), a tablet PC, a set-top box (STB), a personal digital assistant (PDA), a mobile device, a global positioning satellite (GPS) device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 100 can be implemented using electronic devices that provide voice, video or data communication. Further, while a single computer system 100 is illustrated, the term "system" shall also be taken to include any collection of systems or sub-systems that individually or jointly execute a set, or multiple sets, of instructions to perform one or more computer functions.

As illustrated in FIG. 1, the computer system 100 may include a processor 110, for example, a central processing unit (CPU), a graphics processing unit (GPU), or both. Moreover, the computer system 100 can include a main memory 120 and a static memory 130 that can communicate with each other via a bus 108. As shown, the computer system 100 may further include a video display unit 150, such as a liquid crystal display (LCD), an organic light emitting diode (OLED), a flat panel display, a solid state display, or a cathode ray tube (CRT). Additionally, the computer system 100 may include an input device 160, such as a keyboard, and a cursor control device 170, such as a mouse. The computer system 100 can also include a disk drive unit 180, a signal generation device 190, such as a speaker or remote control, and a network interface device 140.

In a particular embodiment, as depicted in FIG. 1, the disk drive unit 180 may include a computer-readable medium 182 in which one or more sets of instructions 184, e.g. software, can be embedded. A computer-readable medium 182 is a tangible article of manufacture, from which sets of instructions 184 can be read. Further, the instructions 184 may embody one or more of the methods or logic as described herein. In a particular embodiment, the instructions 184 may reside completely, or at least partially, within the main memory 120, the static memory 130, and/or within the processor 110 during execution by the computer system 100. The main memory 120 and the processor 110 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a non-transitory computer-readable medium 182 that includes instructions 184 or receives and executes instructions 184 responsive to a propagated signal, so that a device connected to a network 101 can communicate voice, video or data over the network 101. Further, the instructions 184 may be transmitted or received over the network 101 via the network interface device 140.

The present disclosure relates to providing data loss protection for sensitive data using digital fingerprinting. Digital fingerprinting is a process used to protect sensitive information, which can include text, audio, video, or a combination thereof such as multimedia data, from unauthorized use. A digital fingerprint is a set of specialized data generated from designated sensitive information, which is able to accurately identify the designated sensitive information.

Figure 2:
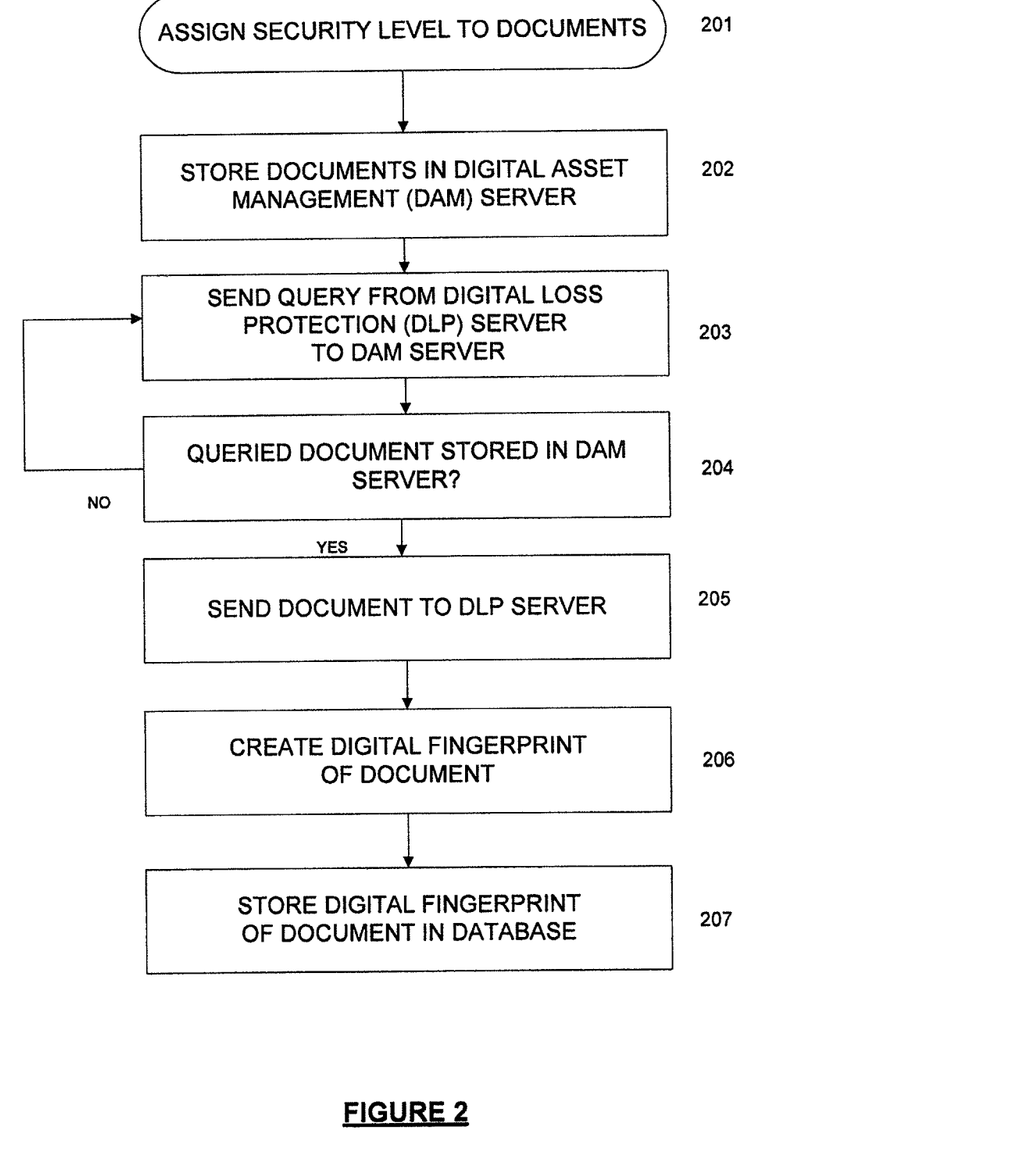
FIG. 2 illustrates an exemplary embodiment of a data loss protection process described in the specification.

FIG. 2 shows an illustration of an exemplary embodiment of a data loss protection process. In a data loss protection system, documents are assigned a security level at 201. Generally speaking, a plurality of different security levels can be used, dependent upon the gradation of different levels of security that are necessary due to the particular operational environment that the data loss protection system is being used. Thus, in some security environments, only a few security levels may be necessary, whereas in other more sensitive security environments, many different security levels may be required.

For any one document, which may contain text only or include multimedia data, more that one security level may be assigned. For a text document, for example, the assignment of multiple security levels would include the assignment of a different security level to different sections of the document. This arrangement provides for a more refined security control process, which would be beneficial in certain circumstances, such as for documents of substantial length and/or that discuss a variety of topics.

Additionally, documents often have portions of text that are common to all security levels. These common sections can be identified so that they are not included in the finger printing of a document. This process is referred to as common text exclusion (CTE) The use of various forms of common text exclusion can assist in reducing or preventing the number of false positive determinations by the data loss protection system that a security level has be violated.

Once a document or documents are annotated with the proper security level, the documents are stored in a digital asset management (DAM) server at 202. This process includes the original assignment and loading of documents into the digital asset management server, as well as the addition of documents in an on-going manner as necessary. The removal of documents, as necessary, is also included in the process. Furthermore, the process recognizes and provides for the alteration or changing of the security levels assigned to a document, since the sensitivity of the information included therein may change due to the occurrence of an event, the passage of time, a change in security policy, etc. An assigned security level may also need to be changed in order to correct an error in data entry or in security assignment. These documents may be stored in a memory or database resident within the data asset management server, or in a memory or data base that is securely controlled by the data asset management server, but is located external to the data asset management server. The external location may be in close proximity to the data asset management server or may be located at a secure remote location and accessible over a communication network.

In the data asset management server, special security features are included. These security features include the restricting the storage of documents such that only a single copy of each document is permitted to be stored in the digital asset management server. Additionally, the single copy of each document is only accessible through a single security access protocol. This single security access protocol includes the verifying the validity of all requests for access to any stored document. Access is either granted or denied dependent upon the results of the verification process. In an alternative embodiment, access may be held in abeyance pending further processing of the request for access. Such further processing may include referral to special security files, requesting supervisory involvement or approval, or any additional processing that may be deemed necessary to resolve unusual situations. Furthermore, information relating to all access requests is recorded in a secure historical access logging database. This secure historical access logging database may be located at the digital asset management server or at a remote location, and may be accessed for reporting purposes, or for subsequent analysis. Such subsequent analysis may be used to adjust security levels, determine the origin of access requests, assess trends, or any other use that may provide information useful to maintain the overall security of the data loss protection system.

A query for access to one or more documents stored in the digital access management server is sent over a communication network to the digital access management server by the data loss protection server at 203. The preferred embodiment of this query is a SQL query, wherein the SQL query includes a request for access to one or more documents and query request information. Such query request information may include one or more of many different types of information. Examples would include one or more desired security levels, document types, specific information within documents, individual names, document origin, document distribution, topics, and any other query that may be useful in accessing specified documents or specified information located within documents.

In response to a query, the digital asset management server determines whether the queried information is located in one or more of the documents stored therein at 204. If the queried information is stored within one or more documents stored in the data asset management server, the queried information is retrieved and prepared for transmission to the data loss protection server. The preparation may include a special transmission format wherein each row in the query response is a complete document file. Additionally, each document file or selective document files may be encrypted prior to transmission. The transmission format may include a standard transmission format or a customized transmission format that includes special security features, such as designated security codes, transitory security codes, a combination of designated and transitory security codes, or any other security feature that enhances the security protection afforded the transmission of the query response.

The query response is then sent from the digital asset management server to the data loss protection server at 205. The query response may be transmitted over a generally accessible communication network, a restricted communication network, a local area network, a wide area network, via the Internet, wirelessly, via satellite, or any other communication network designated for use by the data loss protection system.

After the query response is received by the data loss protection server, the query response is validated for accuracy, checked for transmission errors, and assessed for authorized tampering. After such security processing, the query response is disassembled and the queried information retrieved. At this point, a digital fingerprint of the received information, for example, a document is created by the data loss protection system at 206. As previously discussed, documents often have portions of text that are common to all security levels. These common sections can be identified so that they are not included in the finger printing of a document. This process is referred to as common text exclusion (CTE) The use of various forms of common text exclusion can assist in reducing or preventing the number of false positive determinations by the data loss protection system that a security level has be violated.

In creating the digital fingerprint, the digital fingerprint needs to accurately identify the data and/or document from which the digital fingerprint is created. The digital fingerprint needs to remain accurate even when subject to compression, distortion, or interference. Once the digital fingerprint is created, the digital fingerprint is stored in a memory or secure digital fingerprint database. In the preferred embodiment, information relating to the digital fingerprint, and/or the digital finger print is encrypted to security purposes.

The secure digital fingerprints may be stored in a memory or database resident within the data loss protection server, or in a memory or data base that is securely controlled by the data loss protection server, but is located external to the data loss protection server. The external location may be in close proximity to the data loss protection server or may be located at a secure remote location and accessible over a communication network.

The digital fingerprints may be accessed for a variety of reasons, including for operational and/or reporting purposes. For instance, when a request for the security verification of an identified document is received by the data loss protection server, the data loss protection server may create a digital fingerprint of the identified document, and determine if the created digital fingerprint of the identified document matches any of the digital fingerprints stored in the secure fingerprint database. Another example would be where the data loss protection system monitors one or more communication networks for a particular document, creates a digital fingerprint of a located particular document, and determines if the digital fingerprint of the particular document matches any of the digital fingerprints stored in the secure fingerprint database. In any case, the identification of a match between a queried digital fingerprint and any of the digital fingerprints stored in the secure digital finger print database may be used to initiate subsequent action, which may include one of a number of security enforcement actions to protect sensitive data.

A digital fingerprint may be stored together with metadata associated with the digital fingerprint, which may include information related to data content, security, accessibility, or any other information that would be useful in the data loss protection system. Additionally, once a digital fingerprint is created and stored by the data loss protection server, all temporary stored files associated with the digital fingerprint are removed from the data loss protection server. This removal of temporary files is preferably performed immediately after the creation and storage of the digital fingerprint, but may also be performed at regularly scheduled intervals determined by the data loss protection system to afford a desired level of security.

Figure 3:
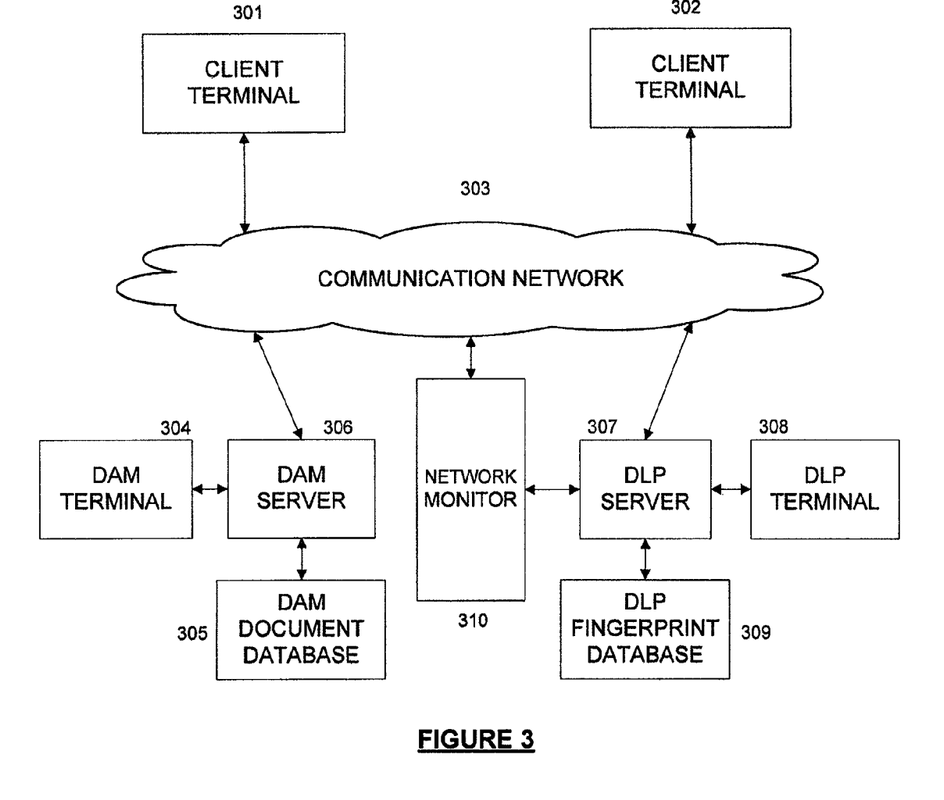
FIG. 3 illustrates an exemplary embodiment of a data loss protection system described in the specification.

FIG. 3 shows an illustration of an exemplary embodiment of a data loss protection system, which could be employed to implement the data loss protection process discussed above. The digital asset management (DAM) server 306 is associated with both a DAM document database 305 that stores sensitive documents encoded with one or more security levels, and a DAM terminal 304 that is used to locally access the DAM server 306. The communication network 303 may be any compatible communication network previously discussed, including usage of the Internet in order to facilitate the implementation of the data loss protection system using cloud computing.

The data loss protection (DLP) server 307 is associated with both a DLP fingerprint database 309 that stores created digital fingerprints, and a DLP terminal 308 that is used to locally access the DLP server 307. Client terminals 301 and 302 are provided to illustrate that the DAM server and the DLP server may be accessed remotely over communication network. For instance, a client terminal may be used to request that the DLP server 307 access the DLP fingerprint database 309 to determine if a match exists between a digital fingerprint of a designated document and one of the digital fingerprints stored in the DLP fingerprint database 309. Network monitor 310 provides for monitoring the communication network 303 to determine if a digital fingerprint of a particular document on the communication network 303 matches one of the digital fingerprints stored in the DLP fingerprint database 309.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the invention in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, the data loss protection method may be implemented using various forms of communication including telephone land lines, cell phones, voice over Internet protocol, and video calls.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present specification describes components and functions that may be implemented in particular embodiments with reference to particular standards and protocols, the disclosure is not limited to such standards and protocols. For example, standards for Internet and other packed switched network transmission (e.g., VoIP, VoiceXML, SALT, SRGS, SISR, SSML, PLS, CCXML) represent examples of the state of the art. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for providing data loss protection of sensitive data using digital fingerprinting, the method comprising:
   determining a determined number and type of different security levels to assign to each document of a plurality of documents associated with a data loss protection server;
   assigning the determined number and type of different security levels to each document of a plurality of documents associated with a data loss protection server;
   storing the plurality of documents in a digital asset management server, wherein only a single copy of each document of plurality of documents is stored in the digital asset management server;
   sending a query to the digital asset management server from the data loss protection server;
   receiving a query response by the data loss protection server from the digital asset management server, the query response including a document file; and
   creating a digital fingerprint of the document file by the data loss protection server,
   wherein sections of the document file that are common to all security levels are not included in the creating of the digital fingerprint.

2. The method as described in claim 1,
   wherein the query is a Structured Query Language query.

3. The method as described in claim 2,
   wherein the Structured Query Language query includes a document security level.

4. The method as described in claim 2,
   wherein the Structured Query Language query includes a document type.

5. The method as described in claim 2,
   wherein each row in the query response is a complete document file.

6. The method as described in claim 1, further comprising:
   performing common text exclusion on document files, including documents files that contain text only, document files that contain text and multimedia data, and document files that contain only multimedia data, wherein text and multimedia data that are common to all security levels in a document file are not included in the creating of the digital fingerprint of the document file.

7. The method as described in claim 6, further comprising:
   encrypting the document file.

8. The method as described in claim 7, further comprising:
   storing the digital fingerprint of the document file in a secure fingerprint database controlled by the data loss protection server.

9. The method as described in claim 8, further comprising:
   removing any temporarily stored files associated with the document file from data loss protection server immediately after the digital fingerprint is stored.

10. The method as described in claim 8,
    wherein the assigning the security level to each document includes assigning different security levels to different sections of a document.

11. The method as described in claim 10,
    wherein the assigning the security level to each document includes identifying sections of the document that are common to all of the plurality of security levels.

12. The method as described in claim 8, further comprising:
    receiving a request for security verification of an identified document by the data loss protection server;
    creating a digital fingerprint of the identified document; and
    determining if the digital fingerprint of the identified document matches any of the digital fingerprints stored in the secure fingerprint database.

13. The method as described in claim 8, further comprising:
    monitoring communication network for a particular document;
    creating a digital fingerprint of the particular document; and
    determining if the digital fingerprint of the particular document matches any of the digital fingerprints stored in the secure fingerprint database.

14. The method as described in claim 1,
    wherein the single copy of each document of the plurality of documents stored in the digital asset management server can only be accessed through a single access protocol.

15. The method as described in claim 14,
    wherein the single access protocol includes verifying the validity of a request for access, determining whether to grant the request for access, and recording information regarding the request for access in a secure historical access log database.

16. The method as described in claim 1,
    wherein the providing data loss protection of sensitive data using digital fingerprinting includes processing of digital audio files.

17. The method as described in claim 1,
    wherein the providing data loss protection of sensitive data using digital fingerprinting includes processing of digital video files.

18. The method as described in claim 1,
    wherein the providing data loss protection of sensitive data using digital fingerprinting includes processing of text documents, digital audio files, and digital video files, wherein a related text document, digital audio file, and digital video file are processed together in response to a query by the data loss protection server.

19. A non-transitory tangible computer-readable storage medium, encoded with at least one computer-executable program for providing data loss protection of sensitive data using digital fingerprinting, and that when executed by a processor, causes the processor to perform operations, comprising:

determining a determined number and type of different security levels to assign to each document of a plurality of documents associated with a data loss protection server;

assigning the determined number and type of different security levels to each document of a plurality of documents associated with a data loss protection server;

storing the plurality of documents in a digital asset management server, wherein only a single copy of each document of the plurality of documents is stored in the digital asset management server;

sending a query to the digital asset management server from the data loss protection server;

receiving a query response by the data loss protection server from the digital asset management server, the query response including a document in a document file; and     creating a digital fingerprint of the document in the document file by the data loss protection server,     wherein sections of the document file that are common to all security levels are not included in the creating of the digital fingerprint.

20. A system for providing data loss protection of sensitive data using digital fingerprinting, the system comprising:

a data loss protection server, including a processor, for assigning a determined number of type of different security levels to each document of a plurality of documents;

a digital asset management server, including a processor, for storing the plurality of documents, wherein only a single copy of each document of the plurality of documents is stored in the digital asset management server;

a network connecting the data loss protection server and the digital asset management server, over which a query is received by the digital asset management server from the data loss protection server, and over which a query response is received by the data loss protection server from the digital asset management server, the query response including a document in a document file,     wherein the data loss protection server creates a digital fingerprint of the document in the document file,     wherein sections of the document file that are common to all security levels are not included in the creating of the digital fingerprint.

\* \* \* \* \*

UNITED STATES PATENT AND TRADEMARK OFFICE
CERTIFICATE OF CORRECTION

| | | |
|---|---|---|
| PATENT NO. | : 8,612,754 B2 | Page 1 of 1 |
| APPLICATION NO. | : 13/159677 | |
| DATED | : December 17, 2013 | |
| INVENTOR(S) | : Stephen Norton | |

It is certified that error appears in the above-identified patent and that said Letters Patent is hereby corrected as shown below:

In the Claims

At column 9, line 65, claim 6, the expression "documents files" should read --document files--.

Signed and Sealed this
Twenty-ninth Day of July, 2014

Michelle K. Lee
*Deputy Director of the United States Patent and Trademark Office*